Patented May 5, 1925.

1,536,618

UNITED STATES PATENT OFFICE.

ALEXANDER NATHANSOHN, OF BAD HARZBURG, GERMANY.

PROCESS OF TREATING LEAD COMPOUNDS.

No Drawing. Application filed March 7, 1924. Serial No. 697,537.

*To all whom it may concern:*

Be it known that I, ALEXANDER NATHANSOHN, a citizen of Germany, residing at 6 Goslarsche Street, Bad Harzburg, Germany, have invented certain new and useful Improvements in Processes of Treating Lead Compounds, of which the following is a specification.

The present invention is for a process of treating lead compounds containing chlorine so as to obtain a lead compound free from chlorine which may be treated to obtain the lead values therein in any suitable manner.

It has hitherto been difficult to remove the chlorine from lead compounds containing same which was the reason for the failure of the Schelle process for manufacturing caustic soda or caustic potash by treating sodium or potassium chlorides with lead oxide. The difficulty with this process was that it was practically impossible to remove all the chlorine from the oxychloride of lead formed by treatment with milk of lime, as large losses of lead ensued.

The present process obviates this difficulty by treating the chlorine compound of lead in suspension in water with lime (calcium hydroxide) in an amount equivalent to the chlorine to be removed and afterwards introducing carbon dioxide into the mixture. The oxychloride of lead is transformed into carbonate of lead with the formation of an equivalent amount of chloride of calcium. The carbonate of lead precipitated may be changed into oxide of lead by calcination or may be treated in any other way desired. The process herein outlined may be carried out at ordinary or at elevated temperatures as it may be at times convenient to deal with hot solutions just as they are obtained in many wet metallurgical processes, as for instance in lixiviating lead compounds with solutions of chlorides. In the latter case, the solutions of chloride are precipitated with hot milk of lime and carbon dioxide is then introduced into the mixture. Carbon dioxide from any convenient source such as the lime kiln or from waste combustion gases may be used.

A practical illustration of my improved process is as follows:—

One ton of lead compounds containing about 600 kilograms of lead and 100 to 150 kilograms of chlorine is agitated in 5 to 10 cubic meters of water with an appropriate amount of milk of lime, containing about 200 kilograms of calcium hydroxide per ton. The end of the reaction may be noted by the fact that the filtrate from the precipitate is practically free from lead. Then carbon dioxide is introduced into the mixture until about two thirds of the lead is transformed into lead carbonate. The precipitate is allowed to settle, the supernatant liquid is removed, more water is added and the treatment with lime and carbon dioxide is continued until the amount of chlorine in the mixture and in the filtrate is identical showing that the precipitate itself is free from chlorine. The chlorine free precipitate is then washed with water and treated in any appropriate manner.

Another illustration of my improved process is to take a mixture of lead chloride and sodium chloride which is treated with milk of lime equivalent to the amount of lead in the solution. The subsequent treatment is as indicated in example 1.

Having thus fully described my invention, what I claim is:—

1. A process for treating chlorine compounds of lead by subjecting same to the action of calcium hydroxide and subsequently treating the mixture with carbon dioxide.

2. A process for treating chlorine compounds of lead by subjecting said compounds to the action of lime, treating the resultant product with carbon dioxide and removing and washing the precipitate so produced.

3. A process for treating chlorine compounds of lead by transforming said chlorine compounds of lead into an oxychloride of lead and subsequently treating said oxychloride of lead with carbon dioxide so as to obtain a precipitate of carbonate of lead.

In testimony whereof I hereunto affix my signature.

ALEXANDER NATHANSOHN.